Dec. 20, 1966 G. L. POWERS 3,292,965
CARGO STORING AND TRANSPORTING APPARATUS
Filed July 9, 1964 3 Sheets-Sheet 1
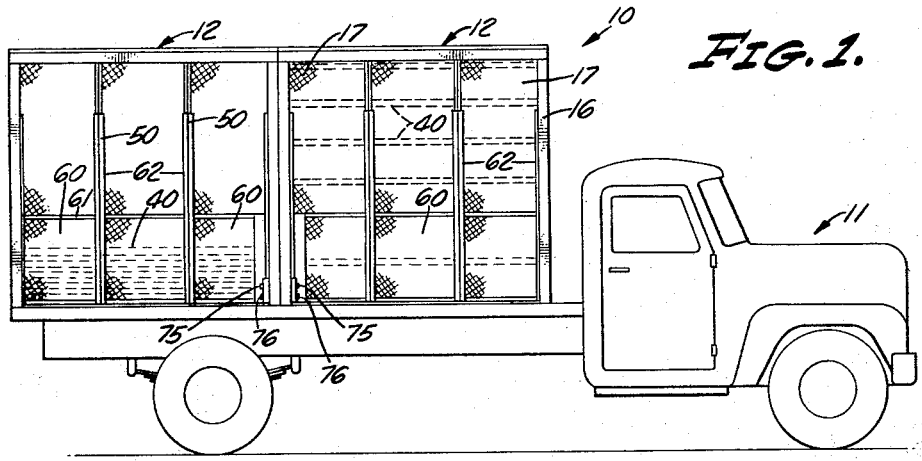
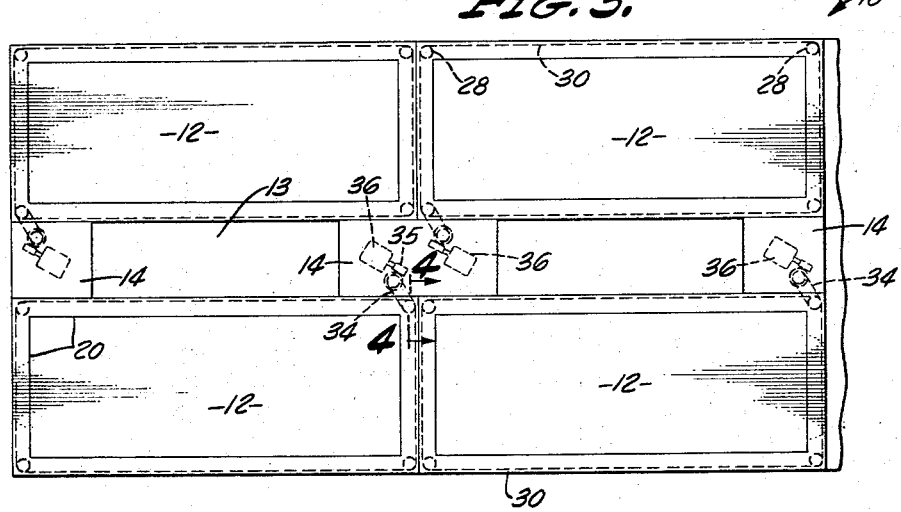
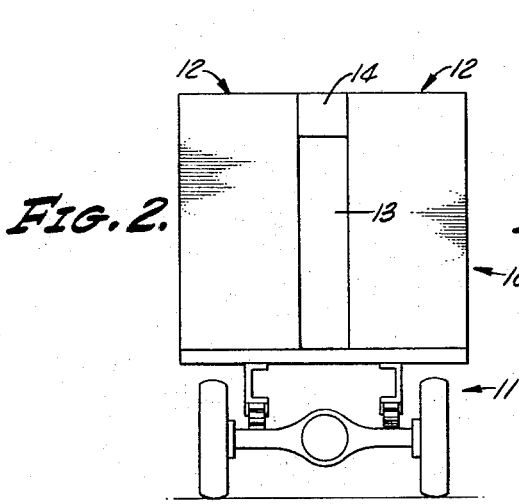
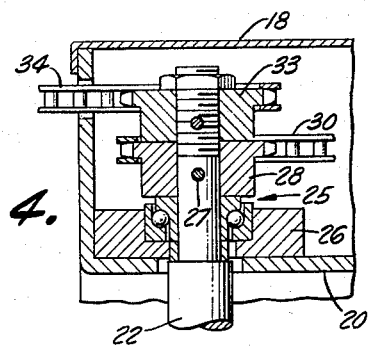
INVENTOR.
GILBERT L. POWERS
BY
ATTORNEY Dec. 20, 1966  G. L. POWERS  3,292,965
CARGO STORING AND TRANSPORTING APPARATUS
Filed July 9, 1964  3 Sheets-Sheet 2

INVENTOR.
GILBERT L. POWERS
BY
ATTORNEY

Dec. 20, 1966 G. L. POWERS 3,292,965
CARGO STORING AND TRANSPORTING APPARATUS
Filed July 9, 1964 3 Sheets-Sheet 3

INVENTOR.
GILBERT L. POWERS
BY
ATTORNEY

United States Patent Office 3,292,965
Patented Dec. 20, 1966

3,292,965
CARGO STORING AND TRANSPORTING
APPARATUS
Gilbert L. Powers, 1831 Monterey Road,
South Pasadena, Calif. 91108
Filed July 9, 1964, Ser. No. 381,487
10 Claims. (Cl. 296—12)

This invention relates to cargo storing apparatus and more particularly to an improved power driven extendible and contractible storage means featuring a plurality of superimposed cargo supports all of which are adapted to be loaded and unloaded at a common station following which filled compartments are moved in succession to a different elevation as the next cargo receiving support is loaded.

The present invention is suitable for installation and use in numerous operating environments but is here illustrated and described as part of a cargo hauling vehicle particularly suitable for use in hauling livestock, poultry and the like. However, it will be understood that the invention is equally advantageous and useful in stationary storage installations as well as in other vehicle applications and wherever it is advantageous to load and unload cargo at a common level either above or below a vertically enlongated storage compartment.

As herein designed and arranged for hauling live poultry the unitary self-contained apparatus is securable to a truck chassis or platform and includes two rows of storage cages opening outwardly along either side of the truck and arranged for loading and unloading from their lower ends by an operator standing on the ground.

Each of the compartments is provided with a plurality of horizontally disposed platforms contractible compactly against one another at the lower end of the storage compartments when unloaded and as an incident to the unloading operation. Power controlled elevating means for the platforms functions to elevate a compartment loaded with fowl by a single increment to expand the next lower compartment into registry with the loading aperture. Following loading of all compartments and transport of the load to its destination, the compartments are unloaded in reverse order from the lower end of the storage space as the several compartments are brought successively into alignment with the loading opening. As the last platform is unloaded it will be appreciated that the various platforms will then be in their contracted condition immediately above the bed of the truck in readiness for reloading.

In poultry transporting equipment heretofore available the vertical tiers of compartments had an individual access door and each had to be loaded and unloaded at its own fixed height. This required one operator positoned on the ground and another positioned on a step ladder or the like trying to maintain precarious equilibrium while endeavoring to control frightened birds in the press of being inserted or withdrawn from a compartment. This was equally hazardous to the safety of the fowl and the operator on the ladder. Not infrequently the fowl are seriously bruised or injured resulting in downgrading of the product at the packing plant.

By the present invention likelihood of injury to the workman as well as to the livestock or poultry is greatly minimized and labor requirements for loading and unloading are reduced by half. Loading and unloading is also accomplished with greater ease and in less time than formerly.

Accordingly it is a primary object of the present invention to provide improved cargo storing apparatus featuring unique provision for loading and unloading vertically arranged compartments from a common level.

Another object of the invention is the provision of power operated expandible and contractible cargo storing means having provision for loading and unloading a plurality of compartments from a stationary loading station.

Another object of the invention is the provision of a cargo hauling truck having a plurality of vertically arranged storage compartments opening along the sides of the vehicle and each equipped with vertically disposed tiers of expandible and contractible cargo receiving means.

Another object of the invention is the provision of self-contained self powered multiple compartment cargo storing apparatus all compartments of which are adapted to be loaded from a single station at one vertical end thereof and wherein the cargo supporting means are collapsible against one another adjacent the loading and unloading end when not in use.

Another object of the invention is the provision of self-contained unitary livestock and poultry hauling equipment securable as a unit to the chassis of a truck and including power means for raising and lowering a plurality of vertically arranged livestock supporting platforms all of which can be loaded and unloaded from a charging opening located adjacent the truck bed.

Another object of the invention is the provision of a control means for extendible collapsible cargo storing apparatus operable to move the storing means through a single increment each time the control system is activated and including limit stop means for automatically deactivating the power system when fully extended or fully collapsed.

These and other more specific objects will appear upon reading the following specification and claims and upon considering in connection therewith the attached drawing to which they relate.

Referring now to the drawing in which a preferred embodiment of the invention is illustrated.

FIGURE 1 is a side elevational view of a cargo truck equipped with one preferred embodiment of the present invention;

FIGURE 2 is a rear end view of FIGURE 1;

FIGURE 3 is a top plan view upon an enlarged scale of the cargo carrying portion of the vehicle;

FIGURE 4 is a fragmentary sectional view taken along line 4—4 on FIGURE 3;

Figure 5:
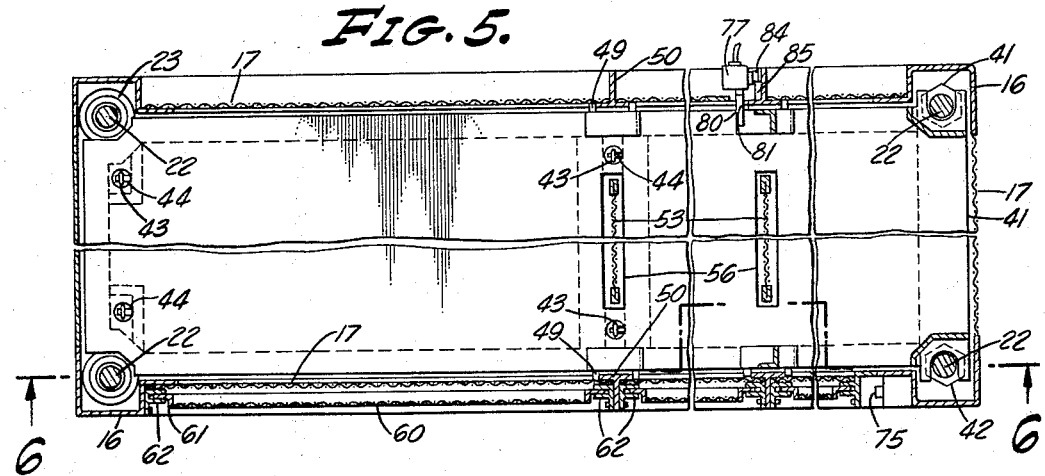
FIGURE 5 is a fragmentary cross-sectional view taken along the broken line 5—5 on FIGURE 6.
Figure 6:
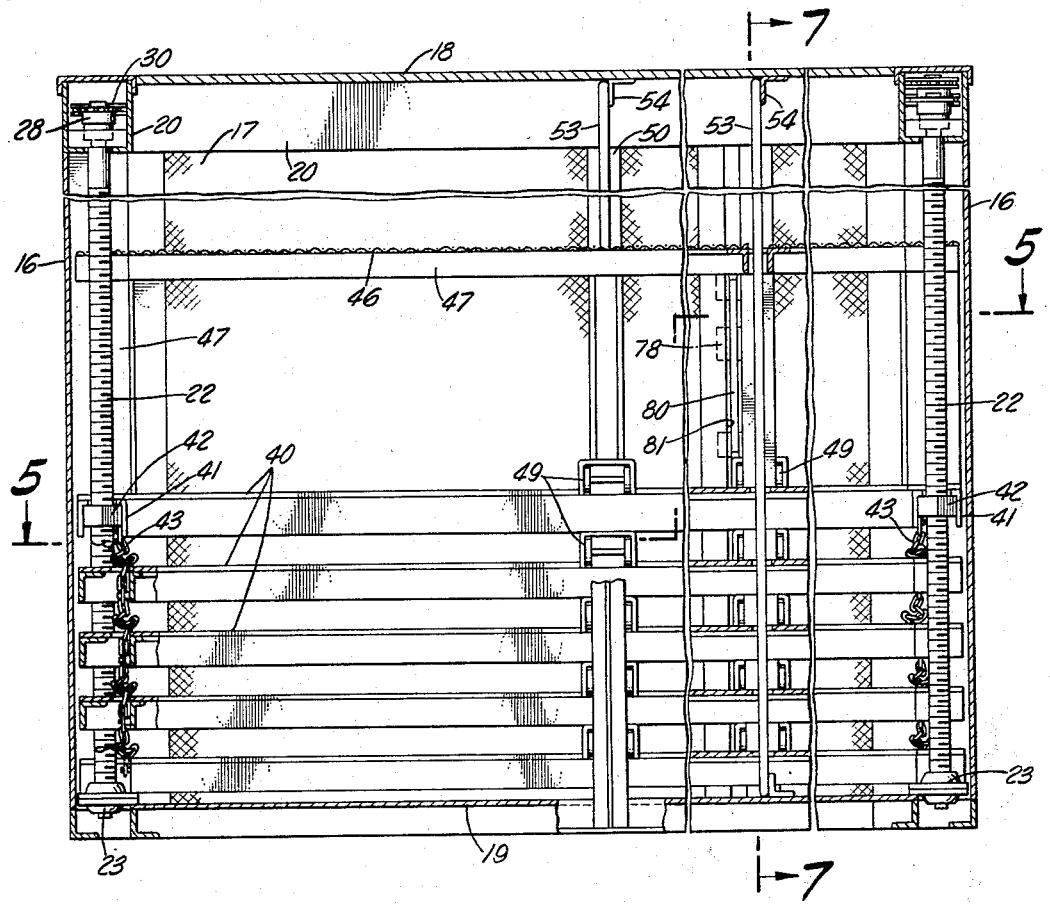
FIGURE 6 is a fragmentary vertical sectional view taken along the broken line 6—6 on FIGURE 5.
Figure 7:
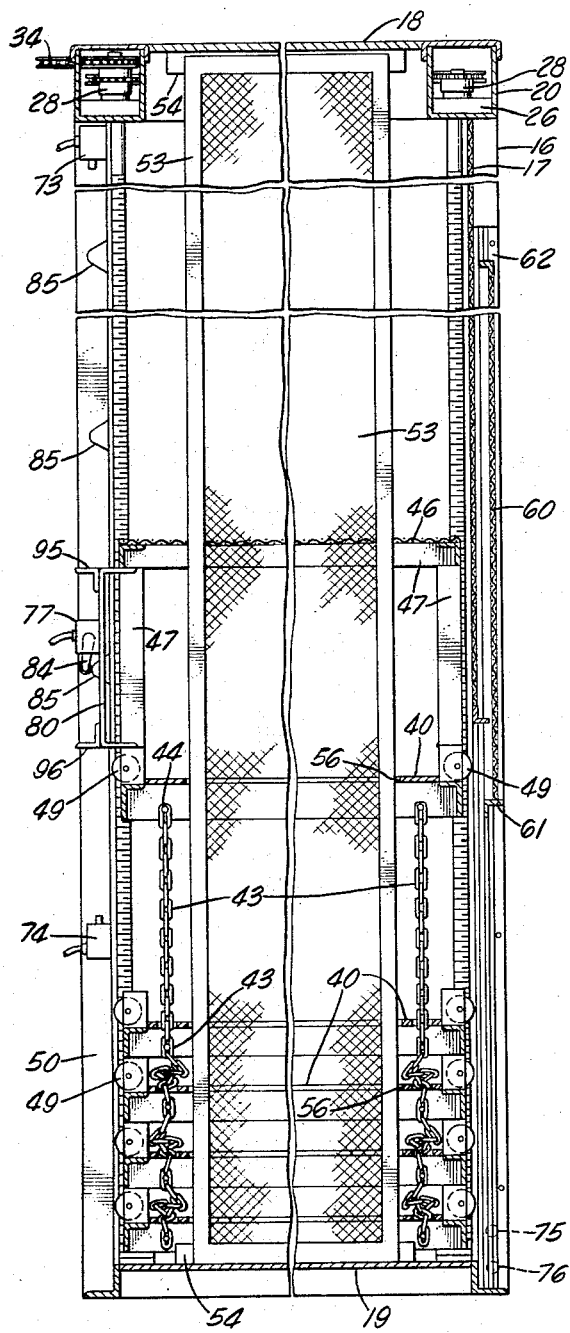
FIGURE 7 is a vertical sectional view taken along line 7—7 on FIGURE 6.

Referring more particularly to FIGURES 1 to 3, there is shown one preferred embodiment of the cargo storing apparatus designated generally 10 and mounted on a truck chassis 11 in any suitable manner. As there shown, apparatus 10 includes two sets of main frames arranged in an upright position along either side of a central aisle and air passage 13 extending longitudinally of the truck as best shown in FIGURE 2. Each set of frames includes a pair of identical units 12, 12 suitably secured together by cross-bracing and including the motor concealing housings 14, 14. Since each of the cargo units 12, 12 is constructed similarly, a description of one will suffice for an understanding of all. FIGURES 5, 6 and 7 illustrate structural details of an individual one of units 12.

Referring to FIGURES 5, 6 and 7, it will be understood that each unit 12 includes a rectangular, upright rigid frame 16 constructed of structural steel components welded together and enclosed along its sides and ends by screening or expanded metal 17. The top and bottom are covered respectively by sheet metal 18, 19.

Main frame 16 includes upwardly opening channel members 20, 20 encircling the upper rim edge of each unit and serving to house the drive sprockets and drive chains employed to expand and contract the cargo carrying platforms utilizing four vertically arranged screws 22. These screws extend the full height of units 12 and are in each corner of the frame, as is best shown in FIGURES 3 and 5. The lower ends of these screws are socketed in self-aligning bearing housings 23 (FIGURE 6) suitably secured to the lower portion of the main frame. To assure that screws 22 are loaded in tension, the upper ends of these screws are suspended from antifriction thrust bearing assemblies 25 supported in bed plates 26 nested in the bottoms of channel members 20, as is best shown in FIGURE 4. Rigidly secured to the upper end of each screw 22, as by pin 27, is a sprocket 28 seating an endless roller chain 30. This chain is housed within channels 20 and mates with each of sprockets 28 secured to the respective screws 22.

Referring to FIGURES 3 and 4, it will be seen that one of the screws for each unit is sufficiently long to support a second sprocket 33 to which the screw is firmly anchored and driving a short chain 34 extending into motor compartment 14 and arranged to be driven by a worm gear assembly and an individual reversible motor 36.

Referring now to FIGURES 5 and 6, it is pointed out that each unit 12 includes a plurality of similar cargo supporting platforms or the like 40 of generally similar construction. The upper one of the platforms has an inverted channel 41 secured crosswise of its ends and sufficiently wide to seat captively a heavy-duty nut 42 mating with the threads of screw 22. All remaining platforms 40 have notched corners fitting loosely about screws 22. It will therefore be recognized that the upper platform and attached nuts 42 are required to move vertically along screws 22 as the latter are rotated. The remaining platform move in time-delay sequence relative to one another and to the upper platform by means of suitable suspension ties or chains 43 interconnecting adjacent platforms, as by pins 44 (FIGURE 7). The lengths of the individual chains are selected such that the platforms will be suspended a predetermined distance or increment from one another when loaded. Thus, referring to FIGURE 7, it will be noted that uppermost platform 40 has been moved upwardly until the next lower platform 40 is in loading position and that the chains 43 interconnecting these two platforms are in tension or about to be tensioned whereas all remaining chains are relaxed and collapsed.

Other features of the platform construction include the provision of a cover screen 46 and a supporting framework 47 therefor secured to the top platform and cooperating with the screened side walls of the cages to provide a confining compartment for poultry placed on the upper platform. This safeguards against the birds flying into the upper portion of the compartment during loading and unloading operations.

It will also be understood that the opposite lateral edges of the several platforms are preferably provided with sets of rollers 49 (FIGURES 5, 6) which straddle the head flanges of the vertically disposed members 50 of T-shape in cross-section and provide antifriction lateral stability for the platforms.

It is desirable to divide storage units 12 into tiers of smaller sections as by vertical divider panels 53, 53, here shown as formed by screen frames anchored to the top and bottom walls of units 12 as by angle irons 54 (FIGURE 7). Each of the platforms 40 as well as screening 46 is provided with slots 56 (FIGURE 5) sufficiently large for divider partitions 53 to fit loosely therethrough as the platforms are raised and lowered. The opposite vertical edges of the divider partitions are sufficiently close to the side walls of the compartments to prevent poultry from passing between adjacent compartments. If desired, and as shown in FIGURE 5, it will be noted that extra sets of the suspension chains 43 are located in the space between the vertical edges of the partitions and the side walls of the main compartments.

Referring more particularly to FIGURES 1, 5 and 7, it is pointed out that the lower end of each of the vertical tiers of storage compartments is provided with a separate screen closure 60 having a rigid perimeter frame 61 of angle iron or the like, this closure being slidably supported in keeper strips 62 secured to the main frame. As shown in FIGURE 1, closures 60 are in closed position whereas in FIGURE 7 one of the closures is elevated to its loading position wherein it is releasably retained by a suitable latch, not shown, and by which the closure can be supported adjustably at different heights lengthwise of keeper strips 62.

Figure 8:
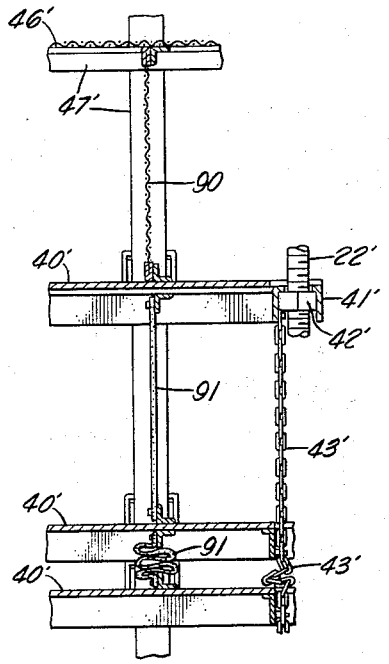
FIGURE 8 is a fragmentary vertical sectional view showing an alternate partition construction between adjacent tiers of the cargo compartments.

Referring now to FIGURE 8, there is shown a slight variant of the partition structure employed to divide the compartments into tiers of smaller compartments. This structure differs from that described above only in that the divider partitions are formed of flexible material and are secured between platforms 40 thereby avoiding the need for slots 56 in the platforms. The same or similar parts of FIGURE 8 are designated by the same reference characters as used in FIGURES 1 to 7 but are distinguished therefrom by a prime. The space between upper platform 40′ and its cover screen 46′ is divided into subcompartments by fixed divider screens 90 only one of which is shown, whereas the corresponding compartments between the remaining ones of platforms 40′ are divided by canvas or sheet plastic partitions 91. The upper and lower edges of these are respectively secured to the adjacent platform 40′ and each is collapsible in the manner illustrated in FIGURE 8 when the platforms are lowered toward one another.

*The control mechanism*

Figure 9:
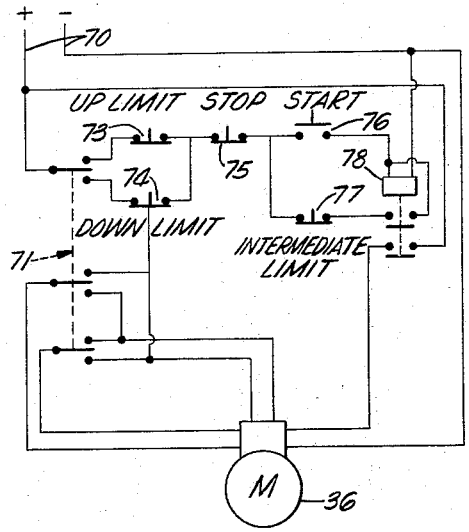
FIGURE 9 is a schematic of the control circuit.

The operating control mechanism for the described storage apparatus includes a reversible motor 36 for each of units 12 connected in circuit with various switches in the manner schematically illustrated in FIGURE 9. These direct current drive motors 36 may be powered by a suitable motor generator set forming part of the cargo storing apparatus or from one driven directly by the vehicle engine. It will also be appreciated that the electrical control system may be used to control fluid flow to hydraulic motors used in lieu of electric motors 36. The main power supply wires 70 are connected to the various control switches and to the reversible motor through a manually operated master switch 71. These switches include an "up" limit switch 73, a "down" limit switch 74, a "stop" switch 75, a "start" switch 76, and an intermediate limit switch 77, all connected in circuit and across the line through the coil of holding relay 78. Except for start switch 76, each of these switches is normally closed and the two pairs of contacts carried by relay 78 are normally open. One pair of contacts of the latter supplies current to the holding coil, whereas the other pair completes the circuit from master control switch 71 to motor 36. FIGURE 9 shows all switches in their normal deactivated condition.

Referring to FIGURES 1, 5 and 7, it is pointed out that the "up" limit switch 73 is located at the upper rear end of one of units 12 whereas the "down" limit switch 74 is located in the proper position to stop downward movement only when the upper one of platforms 40 approaches or reaches its retracted position. The intermediate limit switch 77 is mounted on the rear side of a U-shaped bracket 80 (FIGURE 7) the short horizontal legs of which are secured to framing 47 carried by upper platform 40 and used primarily to support screening 46.

Bracket 80 projects outwardly through a slot 81 (FIGURE 5) formed vertically of screening 17 enclosing the rear side of the storage compartment to the end that switch 77 may be readily accessible and exposed for inspection and servicing. This switch is operated by a lever arm 84 (FIGURE 7) provided at its end with a roller positioned to engage and to be operated by rigidly supported cam members 85 distributed vertically along the rear wall of the compartments closely beside slot 81. Thus, referring to FIGURE 7, it will be observed that switch lever 84 has just engaged and been operated by the underlying cam 85 to open switch 77 thereby de-energizing motor 36 as the uppermost platform 40 is properly positioned for loading or unloading the next lower platform 40. Accordingly, switch 77 will be understood as providing means for automatically positioning the platforms as they reach a proper loading or unloading position, an operation which is accomplished without attention by the operator.

Referring to FIGURES 1 and 7, it is pointed out that the manual stop and start switches 75, 76, respectively, for each storage unit 12 are positioned at one lower corner of these units and in a convenient position for manipulation by the operator in charge of the loading or unloading operation.

*Operation*

Referring to FIGURE 1, let it be assumed that the forward one of units 12 has been loaded with poultry and that the operator is now ready to proceed with the loading of the rear one of units 12. It will be observed that the platforms of the forward unit are uniformly distributed vertically of the storage compartments and that the closure members 60 are all closed.

In proceeding to load the rear unit 12 the operator first closes the master control switch 71 in a direction to operate motor 36 to elevate platforms 40. This having been done, next he latches one of closures 60 in open position and fills this space with fowl and shuts closure 60 and proceeds to charge each of the remaining spaces controlled by the other two closures 60, 60. After the last one has been filled and closed, the operator depresses starting switch button 76 momentarily to complete a circuit through the holding coil of relay 78 thereby immediately closing both pairs of its contacts. As soon as this occurs, current continues to be supplied to the relay holding coil through intermediate limit switch 77 thereby holding the relay closed to supply power to elevating motor 36. This motor operates to drive chains 31, 34 to rotate each of the screws 22 in a direction to elevate the upper platform 40. This elevating operation continues until intermediate limit switch 77 carried upwardly by the upper platform is opened by its operating lever 84 contacting the lower one of cams 85, thereby opening switch 77 and discontinuing current flow to relay 78, which opens and de-energizes motor 36. This operation has just occurred in the position of the parts shown in FIGURE 7 and takes place automatically and without attention by the operator as the platform last loaded is about to tension the chains 43 connecting it to the next lower platform.

The operator continues to load each of the compartments overlying the second one of platforms 40 proceeding in the same manner outlined above. When this has been completed, the operator again momentarily closes starting switch 76 to again energize holding relay 78.

As the lowest one of platforms 40 is being elevated to permit loading the lowest layer of compartments, the motor continues to elevate all of the platforms until a stop 95 (FIGURE 7) mounted on bracket 80 contacts and opens the "up" limit switch 73 thereby deactivating the power supply. A similar rigid stop 96 underlying limit switch 77 functions in a similar manner to open "down" switch 74 during the unloading operation.

Unloading of the compartments proceeds in the reverse order of the loading operation and in the following manner. First, the operator reverses the closed position of master switch 71 so that closing of starting switch 76 supplies power to motor 36 in a manner to operate the motor in its reverse direction. The lowest set of compartments is first unloaded following which the operator momentarily closes starting switch 76. This functions in the same manner as before to activate holding relay 78 and supply power to motor 36. All platforms are now lowered simultaneously by screws 22. As the lower platform 40 approaches contact with bottom wall 19 of the storage compartment, control lever 84 of switch 77 contacts the upper one of cams 85 to open this switch. The lower platform may now be unloaded through closures 60 following which starting switch 76 is again momentarily closed to collapse the next higher platform against the lower one.

If at any time during the operation of motor 36 the operator should desire to stop raising or lowering of the platforms, he merely depresses stop switch 75 to deactivate holding coil 78.

While the particular cargo storing and transporting apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a truck chassis for transporting a plurality of layers of cargo each containing a number of similar items of cargo separately chargeable onto and removable from said truck through openings located along the lower lateral side of the cargo carrying portion of the truck chassis; that improvement in said truck chassis which comprises a unitary self-contained cargo enclosing and storing means secured to said truck chassis, said cargo storing means including a plurality of upright cargo storage compartments arranged in side-by-side relation along the side of said chassis each having an outwardly facing cargo charging opening at their lower ends and along the side of said chassis, a plurality of cargo supporting platforms in each of said compartments having a free-running fit relative to the adjacent interior side walls of said compartments and collapsible compactly against one another at the bottom of the associated one of said compartments and in a convenient position for the loading of cargo items onto the uppermost unloaded one thereof through said charging openings, and means for shifting individual ones of said platforms from the collapsed positions thereof sequentially into predetermined spaced relation with respect to the next adjacent lower one of said platforms until a desired number of the platforms in a particular one of said compartments have been loaded and distributed vertically therealong.

2. A truck chassis as defined in claim 1 characterized in that said storage compartments are divided longitudinally thereof into a pair of rows extending lengthwise of said vehicle and having separate cargo receiving openings along the opposite lateral sides of the vehicle.

3. A truck chassis as defined in claim 1 characterized in that said means for shifting said platforms vertically of said storage compartments comprises sets of vertically disposed rotatable screws located in each of said compartments and passing through threaded nut means carried by the upper one of said platforms in each compartment, flexible tension means interconnecting said platforms and effective to support the same in predetermined spaced relation from the upper one of said platforms, and each of said sets of screws being operable when rotated in unison to distribute the platforms of a selected compartment axially therealong.

4. A truck chassis as defined in claim 3 characterized in that said sets of screws include thrust bearing means at the upper ends thereof, and stationary means for supporting said screws by suspension through said thrust bearing means whereby said screws are under tensile loading when said platforms are distributed vertically therealong.

5. A unitary self-contained cargo transporting compartment assembly securable as a unit to the chassis of a motor propelled vehicle, said unitary compartment assembly having a plurality of upright tiers of normally-closed cargo storing cells arranged in rows lengthwise thereof with each tier having a closure-controlled opening adjacent the lower end thereof and opening laterally outwardly from the outer face of said tiers of cells, said cargo storing cells each having a plurality of horizontally disposed platforms having a free-running fit with the interior side walls of said cells and collapsible compactly against one another at the lower ends of said tiers of cells when unloaded, means for raising and extending said platforms away from one another in succession along with a load thereon toward the opposite end of said cells until a desired number thereof have been loaded and for supporting the same in predetermined spaced-apart relation, and reversible power means for driving said last named means.

6. A unitary self-contained cargo transporting compartment assembly as defined in claim 5 characterized in that said means for raising and lowering said platforms comprises vertically disposed screw means suspended from the upper ends of said compartments so as to be loaded in tension, nut means secured to the upper one of said platforms and engaged with said screws and effective to raise and lower said upper platform depending on the direction of rotation of said screws, and elongated flexible tension means interconnecting the remainder of said platforms with one another and with said upper platform and effective as said upper platform is raised to move the underlying platforms progressively into suspended position therebeneath.

7. A livestock and poultry hauling truck having a plurality of rows of tiered compartments extending in an upright position along either side of said truck which rows are separated from one another by a vertical ventilating passage extending longitudinally of said truck, means supporting a plurality of superimposed platforms in each of said compartments for vertical movement between a collapsed position adjacent the bottom of said compartments and a vertically spaced-apart position to provide a plurality of tiers of superimposed cages each adapted to be charged with live cargo while enroute to market, closure-controlled access openings at the lower end of each tier of said compartments through which live cargo can be inserted into and removed from individual cells between adjacent spaced-apart ones of said platforms while an individual cell is in registry with one of said openings, and manually controlled power means for moving said platforms in succession between their collapsed and extended positions.

8. A livestock and poultry hauling truck as defined in claim 7 characterized in that said power means includes reversible motor means located adjacent the upper ends of said compartments and effective to raise and lower said platforms from a control station readily accessible to an operator at the lower ends of said compartments.

9. A livestock and poultry hauling truck as defined in claim 7 characterized in that the upper one of said platforms includes a top closure together with means supporting the same on said upper platform at a height approximating the vertical distance between said platforms when in extended position.

10. A collapsible and extendible cargo supporting apparatus having a rigid main frame, a plurality of vertically disposed screws suspended from their upper ends at spaced-apart points by said main frame and arranged to be loaded primarily in tension, a plurality of superimposed cargo platforms supported on and arranged horizontally between said screws, the upper one of said platforms having threaded engagement with said screws and adapted to be raised and lowered depending on the direction of rotation of said screws, and flexible tie means interconnecting the opposite ends of said upper platform with the corresponding underlying ends of the remainder of said platforms whereby lowering said upper platform permits the latter to collapse successively against one another and whereby raising said upper platform from its collapsed position is effective to etxend said platforms successively and support the same in suspension beneath said upper platform.

References Cited by the Examiner

UNITED STATES PATENTS

| 1,083,831 | 1/1914 | Holdaway | 119—9 |
| 2,670,860 | 3/1954 | Cogings | 214—16.1 |
| 2,687,814 | 8/1954 | Romick | 214—16.4 |
| 2,829,780 | 4/1958 | Boor | 214—16.1 |

FOREIGN PATENTS

| 184,915 | 8/1922 | Great Britain. |
| 312,729 | 6/1929 | Great Britain. |

MILTON BUCHLER, *Primary Examiner.*

BENJAMIN HERSH, *Examiner.*

P. GOODMAN, *Assistant Examiner.*